United States Patent [19]

Roland et al.

[11] 4,415,893

[45] Nov. 15, 1983

[54] DOOR CONTROL SYSTEM

[75] Inventors: Manfred W. Roland, Mountain View; Max G. Roland, Redwood City, both of Calif.

[73] Assignee: All-Lock Electronics, Inc., New Brunswick, N.J.

[21] Appl. No.: 243,739

[22] Filed: Mar. 16, 1981

Related U.S. Application Data

[63] Continuation of Ser. No. 919,703, Jun. 27, 1978, abandoned.

[51] Int. Cl.[3] .......... H04Q 9/00

[52] U.S. Cl. .......... 340/825.31; 235/382; 340/543

[58] Field of Search .......... 70/277, 278, 402, 407, 70/DIG. 52, 283; 235/380, 382; 361/172; 340/825.31, 543

[56] References Cited

U.S. PATENT DOCUMENTS

| | | | |
|---|---|---|---|
| Re. 29,259 | 6/1977 | Sabsay | 340/149 A |
| 3,500,326 | 3/1970 | Benford | 340/147 R |
| 3,639,906 | 2/1972 | Tritsch | 340/149 A |
| 3,659,063 | 4/1972 | Peterson | 200/61.7 |
| 3,670,538 | 6/1972 | Curry | 70/277 |
| 3,688,269 | 8/1972 | Miller | 340/149 R |
| 3,700,859 | 10/1972 | Laurer et al. | 235/382 |
| 3,733,862 | 5/1973 | Killmeyer | 70/277 |
| 3,797,936 | 3/1974 | Dimitriadis | 70/277 |
| 3,821,704 | 6/1974 | Sabsay | 340/149 A |
| 3,838,234 | 9/1974 | Peterson | 200/61.7 |
| 3,842,629 | 10/1974 | Pazer et al. | 340/825.31 |
| 3,845,362 | 10/1974 | Roe | 340/149 |
| 3,860,911 | 1/1975 | Hinman et al. | 340/149 |
| 3,889,501 | 6/1975 | Fort | 361/172 |
| 3,902,342 | 9/1975 | Zucker et al. | 70/402 |
| 3,906,447 | 9/1975 | Crafton | 340/149 A |
| 3,926,021 | 12/1975 | Genest et al. | 340/149 R |
| 3,944,976 | 3/1976 | France | 340/149 A |
| 4,050,063 | 9/1977 | Schull | 340/147 MD |
| 4,079,605 | 3/1978 | Bartels | 70/277 |
| 4,090,175 | 5/1978 | Hart | 340/149 A |
| 4,144,523 | 3/1979 | Klapit | 340/147 MD |
| 4,148,012 | 4/1979 | Baump et al. | 340/147 MD |
| 4,157,534 | 6/1979 | Schachter | 340/825.31 |
| 4,209,782 | 6/1980 | Donath et al. | 340/147 MD |
| 4,218,690 | 8/1980 | Ulch et al. | 340/825.31 |

*Primary Examiner*—Donald J. Yusko
*Attorney, Agent, or Firm*—Larson and Taylor

[57] ABSTRACT

A door control unit for electronically locking and unlocking one or more doors. The door control unit includes door locking means having a rotatable lock cylinder for locking and unlocking a door, means engaging the lock cylinder for normally locking the door, and means responsive to a control signal for unlocking the door. A key is included having a first and second series of light-refractive discrete encoded clocking and data bars formed thereon. The lock cylinder includes photodiode means for reflectively decoding the encoded data on the key upon insertion of the key into the lock cylinder, thereby generating a first identification code. The first code is compared with at least one other predetermined identification code by processor means and if the two signals correspond, the control signal is generated thereby unlocking the door.

12 Claims, 16 Drawing Figures

FIG-3
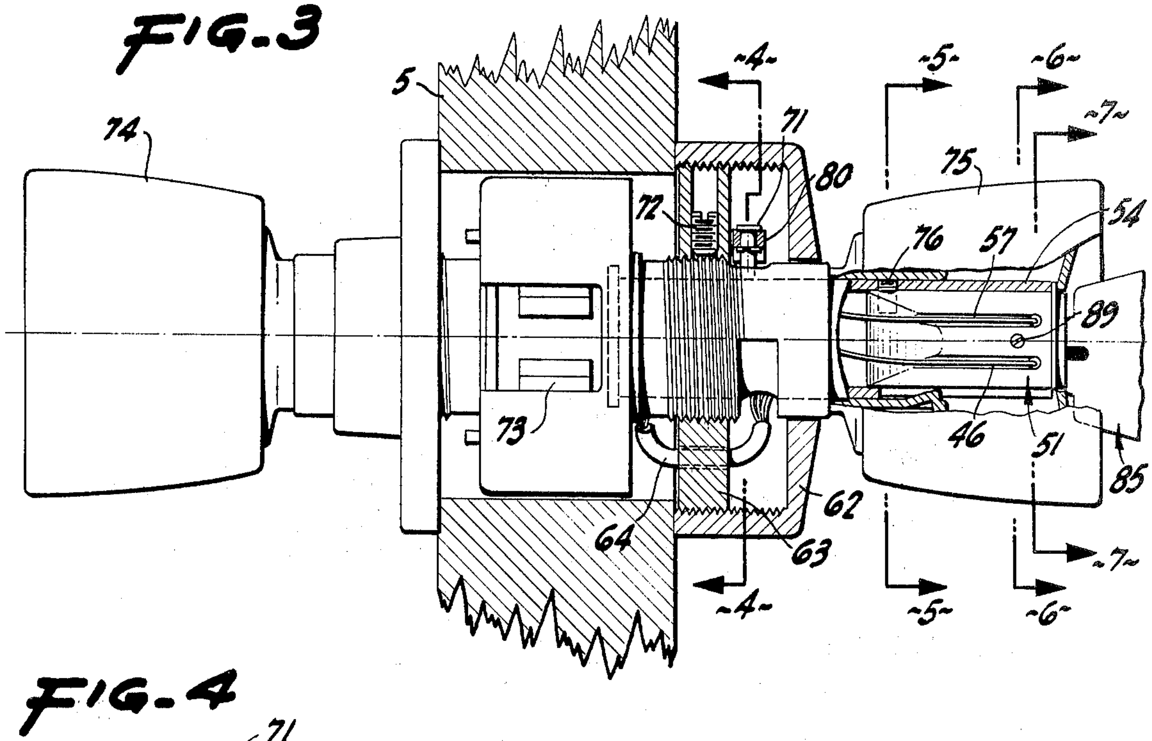
FIG-4
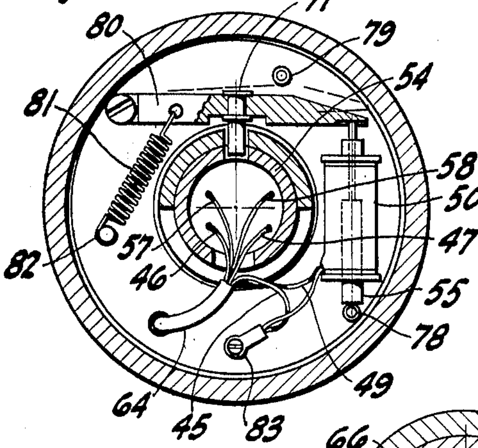
FIG-5
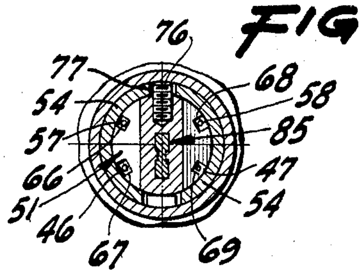
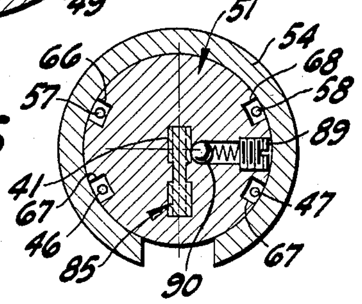
FIG-6
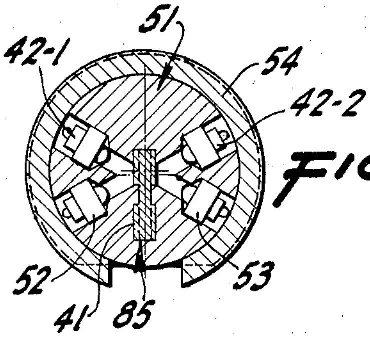
FIG-7
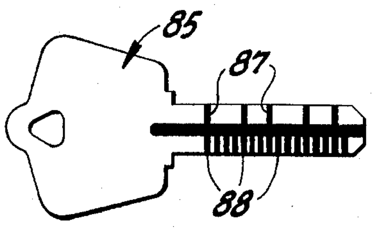
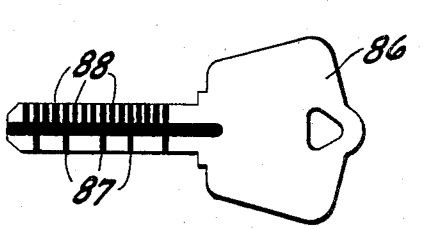
FIG-8
FIG-9

FIG-12
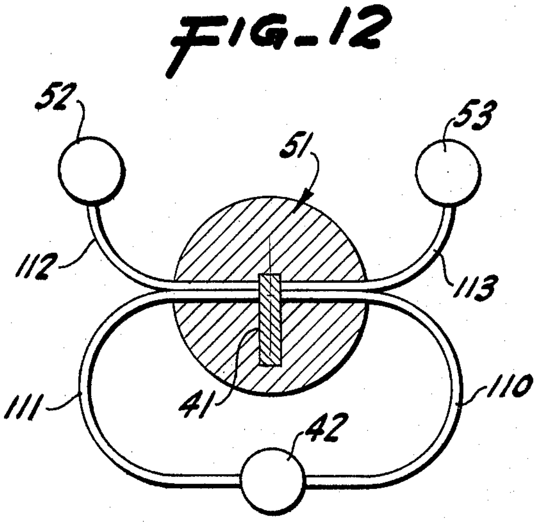
FIG-13
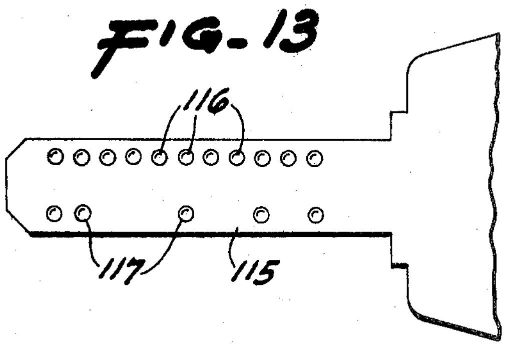
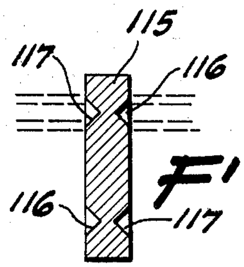
FIG-14
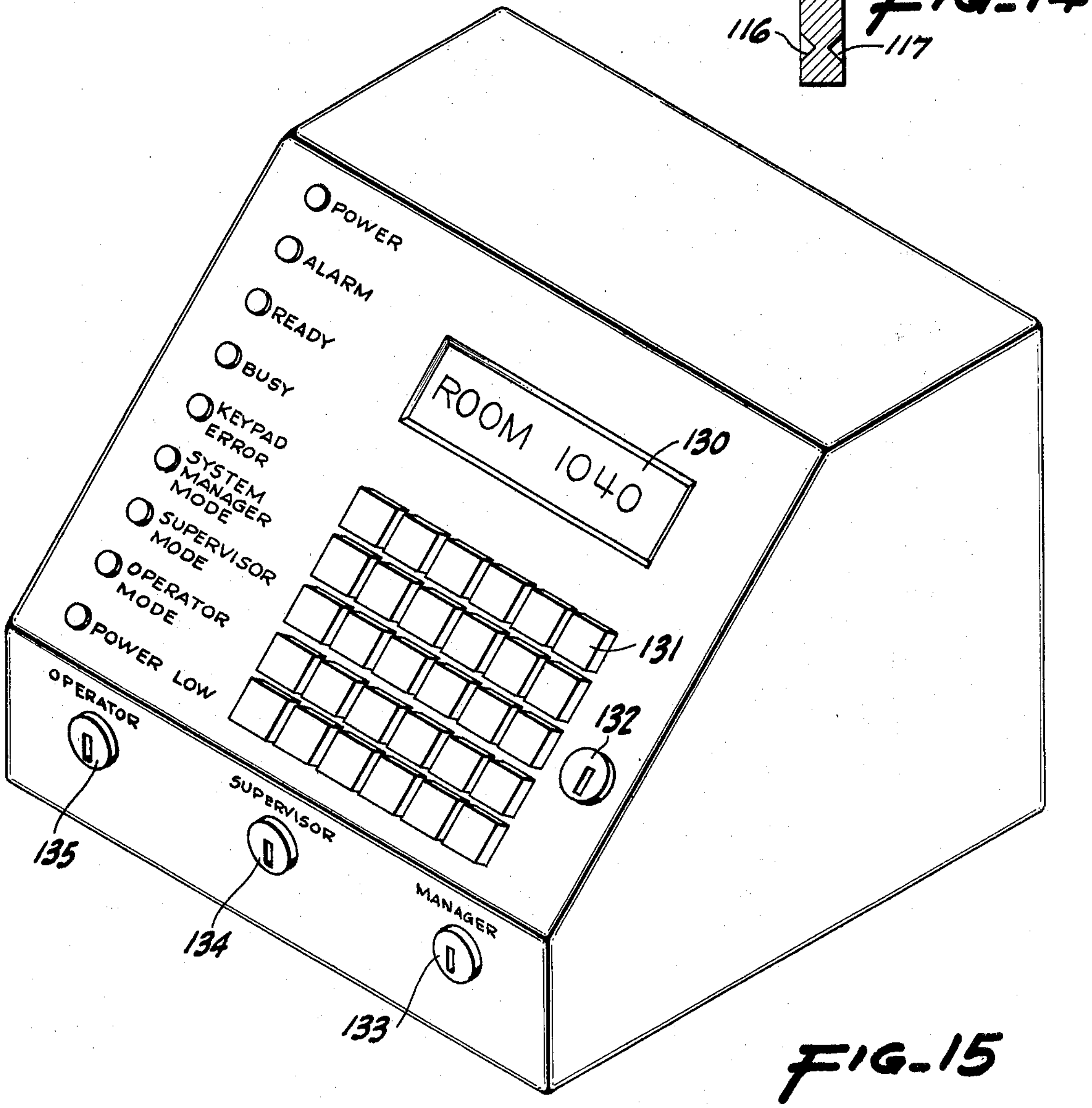
FIG-15

DOOR CONTROL SYSTEM

This is a continuation of application Ser. No. 919,703, filed June 27, 1978, now abandoned.

BACKGROUND OF THE INVENTION

The present invention relates to a door control unit for electronically locking and unlocking one or more doors.

Door control units for electronically controlling the locking and unlocking of a door are well known in the art, as described for example in U.S. Pat. No. 3,889,501, among others.

In general, doors may be unlocked electronically by forming a series of holes, notches or apertures along the shaft of a key in a predetermined arrangement to form encoded clocking and data signals which can be "read" by electronic detection circuitry installed within the door to permit unlocking of the door when the proper encoded signals are detected.

A disadvantage of prior art units is that they are not easily adaptable to presently existing door locks within the door, such as in the door knob, as additional locking structure must be installed in the door to provide the electronic mode of operation, which increases the cost of the system.

The capability of remotely changing the "combination" of the particular door lock is also known, but in order to achieve this, the combination itself has generally been located in a memory location in a master control unit, which requires continuous communication between the door unit and the master unit. Should a power failure occur, the door control unit must be switched to a mechanical mode of operation for unlocking the door, which requires additional locking structure to be included within the door itself, as the electronic mode of operation of the system is then not possible.

In prior art systems such as described in U.S. Pat. No. 3,926,021, those systems provide a reading or decoding device in the door itself for decoding the combination which is in the form of a data card. These systems generally require complex decoding or reading structure to be ihcorporated into the door lock itself.

Another problem occurring with prior art systems is that dirt and dust can collect in the hollow spaces or apertures of the encoded keys, which can affect accurate decoding of the key resulting in failure of the door control unit to unlock the door as desired.

In view of the above background, it is an objective of the present invention to provide a door control unit that is easily adaptable to presently existing doors while additionally containing the combination of the lock within the door control unit itself, thereby providing the capability of remote changing of the combination of the door lock from a master control unit should the need arise, while remaining essentially independent of the master control system, thereby providing an electronic mode of operation even in the event of a power failure.

SUMMARY OF THE INVENTION

The present invention relates to a door control unit for electronically locking and unlocking one or more doors.

In one embodiment, the door control unit includes door locking means having a rotatable lock cylinder for locking and unlocking a door and means engaging said lock cylinder for normally locking said door. Means responsive to a control signal are provided for unlocking the door. A key is provided having a first and second series of light-reflective discrete encoded bars formed thereon, said first series being laterally offset to the second series. The lock cylinder includes photodiode means carried thereon for reflectively reading the first and second series of encoded bars on the key upon insertion of said key into the lock cylinder thereby forming a first identification code. A microprocessor is provided for comparing the first identification signal with at least one other predetermined identification code for generating the control signal when the identification codes correspond to each other, thereby unlocking the door.

In another embodiment, a door control system is provided for selectively controlling the locking and unlocking of a plurality of doors. The system includes a plurality of door control units, where each of the units include door locking means having a rotatable lock cylinder for locking and unlocking a door. Means are provided for normally locking the door and solenoid means are provided responsive to a control signal for unlocking the door. A key is provided having first and second series of light-reflective discrete encoded bars formed thereon, the first series being laterally offset to the second series. The lock cylinder includes photodiode means carried thereon for reflectively reading the first and second series of encoded bars upon insertion of the key into the lock cylinder thereby forming a first identification code. A microprocessor is provided for comparing the first identification cosde with at least one other predetermined identification code for generating the control signal thereby unlocking the door. Master control means are provided for selectively generating the other predetermined identification codes for each of the processor means and also includes means for selectively changing the other predetermined identification codes thereby providing remote capability of locking and unlocking the doors.

In accordance with the above summary, the present invention achieves the objective of providing an improved door control unit.

Additional objects and features of the invention will appear from the description in which the preferred embodiments of the invention have been set forth in detail in conjunction with the drawings.

BRIEF DESCRIPTION OF THE DRAWINGS

FIG. 3 depicts a cross-sectional view of a typical door lock which has been modified according to the present invention.

FIG. 4 depicts a cross-sectional view of FIG. 3 taken along line 4—4.

FIG. 5 depicts a cross-sectional view of FIG. 3 taken along line 5—5.

FIG. 6 depicts a cross-sectional view of FIG. 3 taken along line 6—6.

FIG. 7 depicts a cross-sectional view of FIG. 3 taken along line 7—7.

FIGS. 8 and 9 depict one variation of the present invention for encoding a key.

FIGS. 12–14 depict another embodiment of the present invention.

FIGS. 15 and 16 depict the master control unit of FIG. 1 in more detail.

DETAILED DESCRIPTION OF THE DRAWINGS

Figure 1:
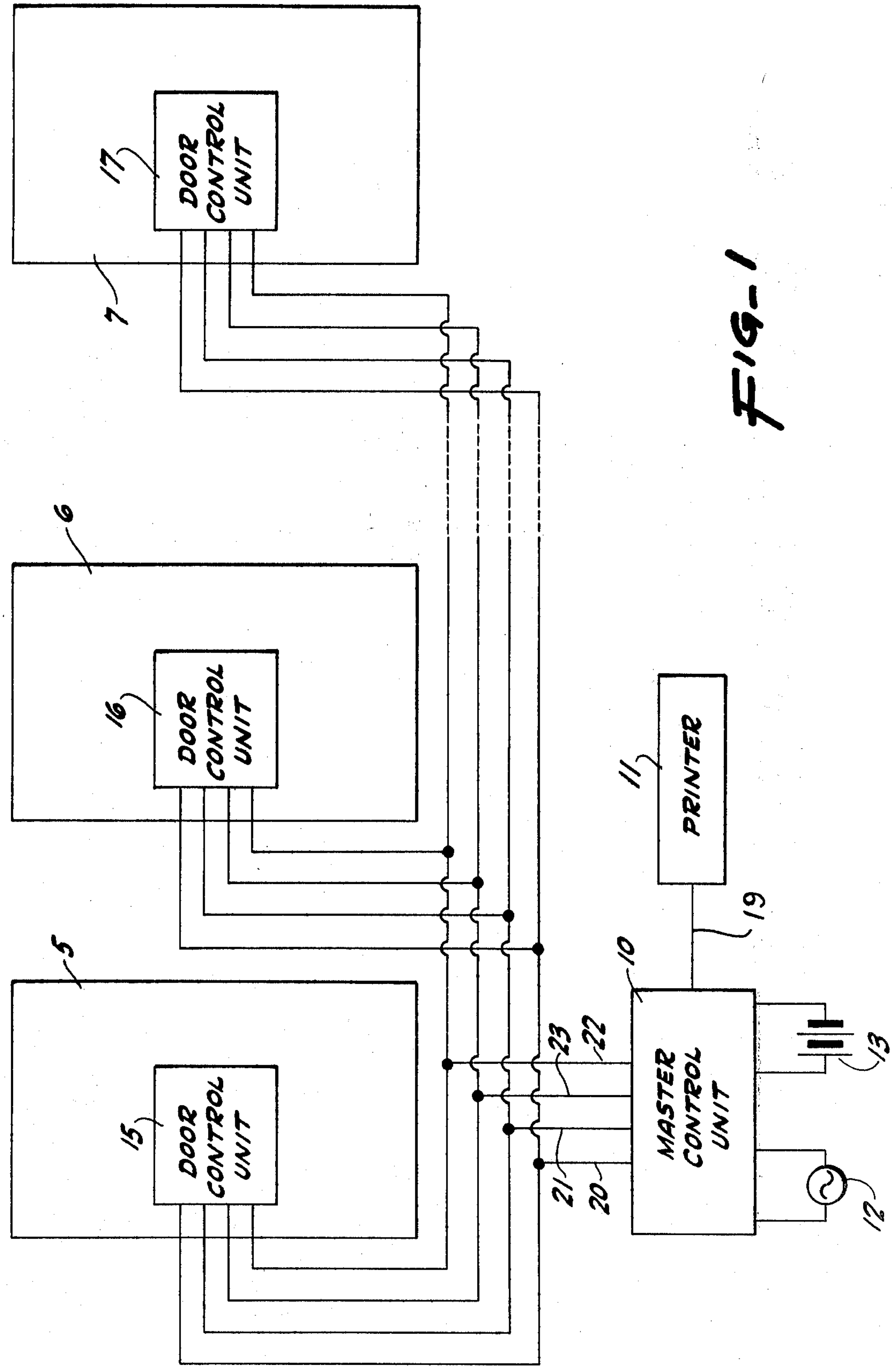
FIG. 1 depicts a system block diagram for controlling a plurality of door control units according to the present invention.

Referring to FIG. 1, there is shown therein a system block diagram for controlling a plurality of door control units.

In FIG. 1, the master control unit 10 receives proper supply voltage from AC supply 12 or, in the event of a power failure, battery voltage 13. Master control unit 10 provides appropriate displays on printer 11 via bus 19, as will be described.

The master control unit 10 is connected to a plurality of door control units 15, 16 and 17, contained within doors 5, 6, 7. The units 15–17 can be installed in presently existing buildings having a large number of doors such as hotels, motels, and institutional, government and office buildings.

Master control unit 10 communicates with each of the door control units 15–17 via data link buses 20, 21, power bus 22, and a ground bus 23. However, communications between the master control unit 10 and door control units 15–17 could be by house wiring, ultrasonic techniques or other well known communication methods.

Figure 2:
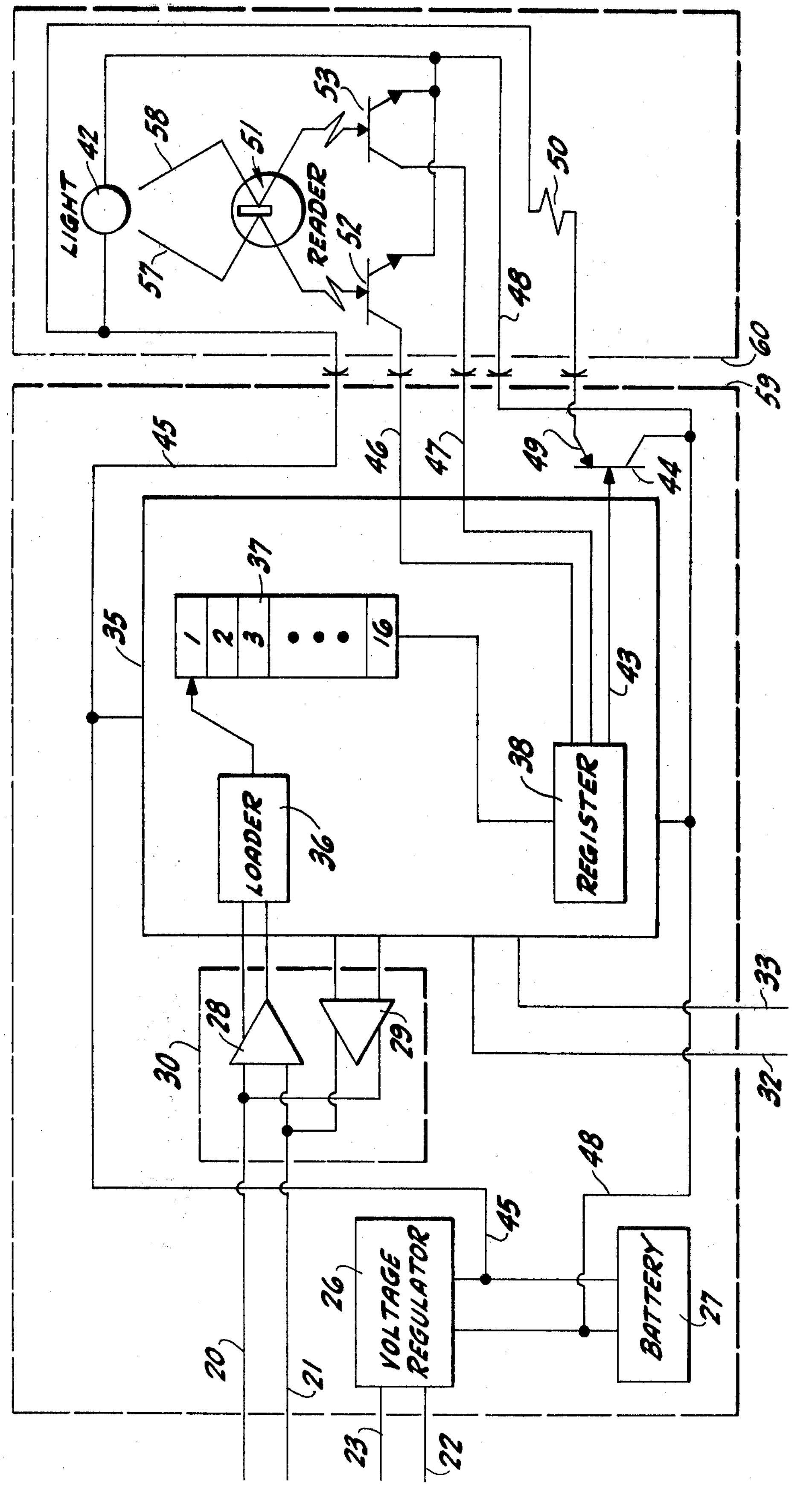
FIG. 2 depicts a schematic diagram for a door control unit of FIG. 1.

Referring now to FIG. 2, there is shown therein a schematic diagram for one of the door control units 15–17 of FIG. 1.

In FIG. 2, a door control unit (DCU) such as DCU 15 of FIG. 1 is connected to the master control unit 10 via buses 20–23. Data link buses 20, 21 are connected to transceiver 30 in door control unit 15. Power and ground buses 22, 23, respectively, are connected to conventional voltage regulator 26 which provides proper DC voltage on buses 45, 48.

In the event of a power failure, a conventional battery 27 is provided to automatically provide the necessary voltage on buses 45, 48.

The heart of the door control unit 15 of FIG. 2 is formed by conventional microprocessor 35, such as Intel's Model 8021 and includes conventional loader 36, Random Access Memory (RAM) 37 and register 38. A master control unit 10 of FIG. 1 communicates with processor 35 via data link buses 20, 21 and transceiver 30.

Transceiver 30 includes conventional receive buffer 28 and transmit buffer 29 for transmitting data between a door control unit and master control unit 10.

The decoding or reading structure contained within a door lock is depicted in FIG. 2, including a conventional key plug 51 which has been modified to contain or carry thereon light-emitting diodes 42 and corresponding photo-sensitive transistors 52, 53. The decoding structure will be described in more detail in conjunction with FIGS. 3–9.

An encoded key containing light-reflective bars is inserted into key plug 51, and photodiode sensing means comprising LED 41-1-phototransistor 52 and LED 42-2-photo transistor 53 pairs, reflectively, decode the clocking and data information on the key. The necessary voltage for the LED's is provided by power bus 45 from DCU 15.

The encoded clocking and data signals are coupled to the DCU via buses 46, 47, respectively, to register 38 in processor 35.

The encoded data is compared with a previously encoded "combination" stored in RAM 37. In one embodiment, RAM 37 stores up to sixteen different "combinations" thereby allowing up to sixteen different encoded keys to open the door. Other variations are, of course, possible.

If the encoded data on buses 47, 46 corresponds to the data stored in memory 37, register 38 provides an enable signal via bus 43 to transistor 44 which is connected to door solenoid 50 via bus 49. Power to solenoid 50 is provided by bus 45. As the solenoid 50 is activated, the lock cylinder is released from its normally locked position and the door may be opened.

The door frame 59 and door edge 60 provide completion of the necessary electrical circuits for buses 45–49 when the door is normally in a closed position. Another method of completing the electrical circuit could be with use of a conductive door hinge such as described in U.S. Pat. Nos. 3,838,234 and 3,659,063.

Processor 35 can easily be adapted to be connected to a conventional smoke detector or fire detector sensor via buses 32, 33, which will provide a control signal informing the processor of the presence of fire or smoke in the particular room. The processor can then inform the master control unit 10 via the communication buses 20, 21 of the presence of fire or smoke.

Referring now to FIG. 3, there is shown therein a cross-sectional view of a typical door lock well known in the art which may be utilized in conjunction with the present invention. FIG. 3 depicts a Schlage heavy duty D/lock, and will be described briefly in conjunction with FIGS. 4–7. It should be remembered that the present invention may be easily incorporated into other types of existing door locks.

In FIG. 3, the door lock is carried within a door such as door 5 of FIG. 1 and includes door knobs 74, 75 for opening the door from the inside and outside, respectively. When either door knob is rotated, this serves to enable tongues 73 to withdraw into the door in the well known manner and translate a door latch (not shown) to enable opening of the door.

In FIG. 3, the door lock has been modified in the following manner. The conventional pintumbler or key plug has been replaced by a modified key plug 51 which is carried within cylinder 54. An Allen screw 77 is provided to connect key plug 51 to cylinder 54.

Support plate 63 is modified to carry thereon the locking means which will be described in conjunction with FIG. 4. Cable protector 64 is provided for protecting buses 45–49, 57 and 58. Allen screw 72 insures that support plate 63 can be fixedly connected to the door lock.

A roses or cap 62 is slightly modified to enable the locking structure to be completely covered by the enlarged rose 62. Pin 71 is provided to normally retain the door in a locked position and will be shown more clearly in FIG. 4. Key plug 51 contains slots 66, 67 carried thereon for providing a channel or slot for buses 46, 47, 57, 58. Allen screw 89 provides biasing for a ball bearing arrangement which will be described in conjunction with FIG. 6.

In FIG. 4, there is depicted a cross-sectional view of FIG. 3 taken along line 4—4 of FIG. 3. In FIG. 4, buses 45–49 and 57, 58 are carried through support plate 63. Buses 45 and 49 provide power for conventional solenoid 50, which is carried on the face of support plate 63 and supported by retaining pin 78. Pin 71 is shown for normally engaging the door lock in a locked position, as lock cylinder 54 and key plug 51 cannot be rotated while pin 71 is in an engaged position.

When solenoid 50 is actuated, solenoid arm 55 is raised to raise lever 80, which in turn raises pin 71. When power to solenoid 50 is disconnected, spring 81 which is connected to arm 82 provides bias control means for returning pin 71 to its engaged or locked position. Pin 79 normally prevents lever 80 from disengaging pin 71 from the locking means.

In FIG. 5, there is shown therein a cross-sectional view of FIG. 3 taken along line 5—5. Key plug 51 contains key slot 41 milled therethrough in a conventional manner. Allen screw 76 insures that key plug 51 and cylinder 54 are fixedly connected. Slots 66–69 carry buses 57, 46, 58, and 47, respectively.

In FIG. 6, there is depicted therein a cross-sectional view of FIG. 3 taken along line 6—6. Key 85 is engaging ball bearing 90 which is spring biased via Allen screw 89. The engagement of key 85 and ball bearing 90 provides a "mechanical" feel to the door control unit as the bearing 90 engages a key inserted into plug 51. It has been observed that a mechanical feel when unlocking a door gives a feeling of security not normally present when an encoded key is inserted into a decoding device.

In FIG. 7, there is depicted therein a cross-sectional view of FIG. 3 taken along line 7—7 and in which photodiode means 42-1, 52 and 42-2, 53, respectively, are carried by plug 51 for reflectively decoding the data and clocking information on key such as 85. The photodiode means are conventional and well known in the art and are arranged in one embodiment to reflectively decode the encoded information.

In FIGS. 8 and 9, there is shown one variation of the present invention for encoding a key. In FIG. 8, clocking bars 88 are recessed and provide appropriate clocking data when inserted into key plug 51. The data bars 87 may be arranged in any predetermined fashion to form an encoded data signal or code when decoded by the door control unit. In FIG. 9, it can be seen that the identical data is encoded on the reverse side of the key thereby providing a reversible key for the door control unit.

Figure 11:
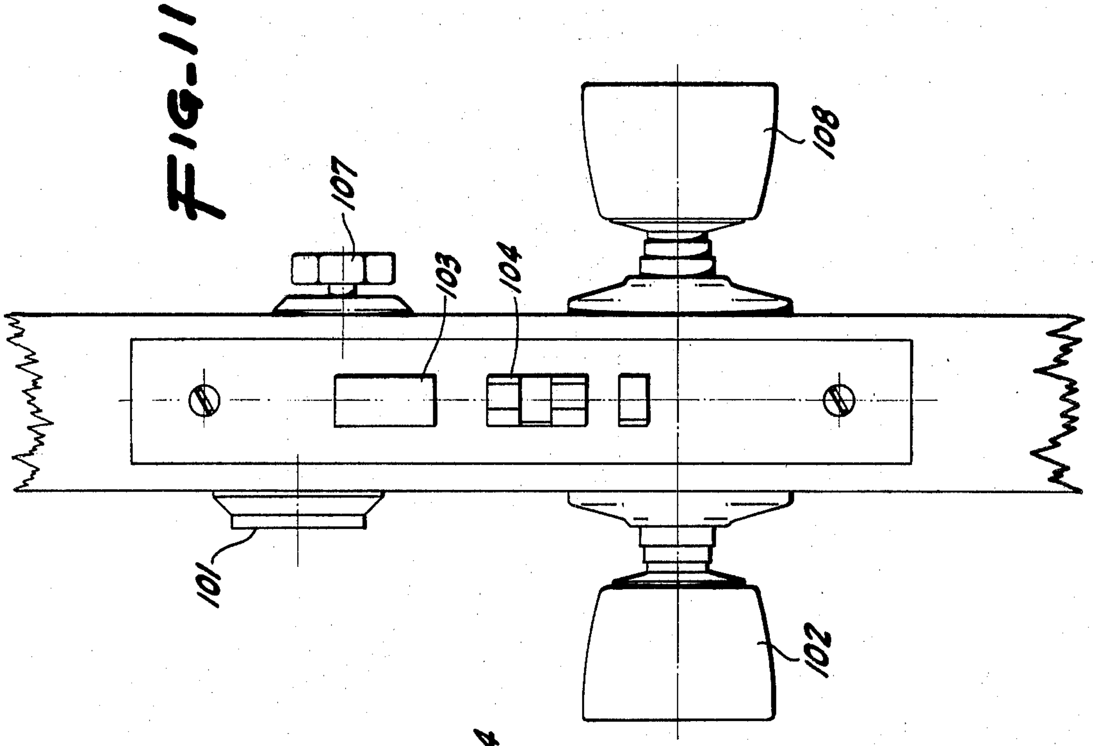
FIGS. 10 and 11 depict another embodiment of the present invention.
Figure 10:
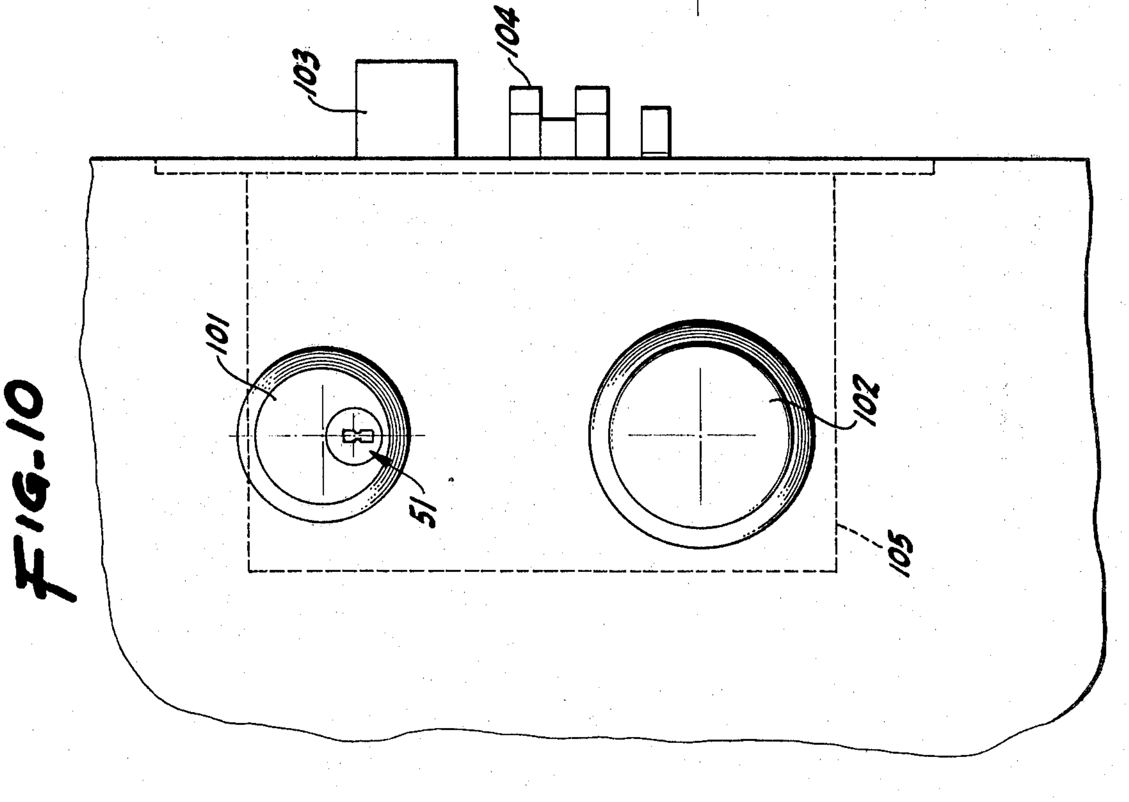

In FIGS. 10 and 11, there is depicted therein another door lock in which the present invention can be adapted easily.

FIGS. 10 and 11 depict a hotel lock with a well known mortise cylinder 101, which when actuated engages dead bolt 103 in the normal fashion. Door knobs 102, 108 engage latch 104 to permit opening of the door if dead bolt 103 is recessed into door lock 105. The key cylinder 101 of the mortise lock is adapted to carry key plug 51 and key way 41 in a manner similar to that of FIG. 3.

In FIG. 11, the end view of the mortise door lock of FIG. 10 is shown in which door knob 102 and 108 will engage latch 104. Dead bolt 103 may be engaged by turning thumb turn 107 or actuating mortise cylinder 101. It can be seen that the door control unit of the present invention can be easily adapted for the door lock of FIGS. 10 and 11.

In FIG. 12, the means for reflectively decoding the information on the bars can be modified to use optic fibers. Optic fibers 110, 111 are connected to light source 42 and carried flush with key way 89 in key plug 51. Optic fibers 112, 113 are connected to photosensitive transistors 52, 53 of FIG. 2 and are carried parallel to optic fibers 110, 111.

In FIGS. 13 and 14, there is shown an arrangement for clocking and data information of the present invention. In FIG. 13, the clocking and data information is arranged with "dimples" as seen in FIG. 14. As the key 115 of FIG. 13 is inserted into key way 89 of FIG. 12, and the flat part of the key passes the optic fibers, there is no space for reflection and a "zero" is read. When a dimple or any recessed part passes the fibers, a reflection is detected and a "one" is read. An advantage of this is that no dirt or dust collect in the hollow spaces and there is no intermediate or defective decoding of the information.

Figure 16:
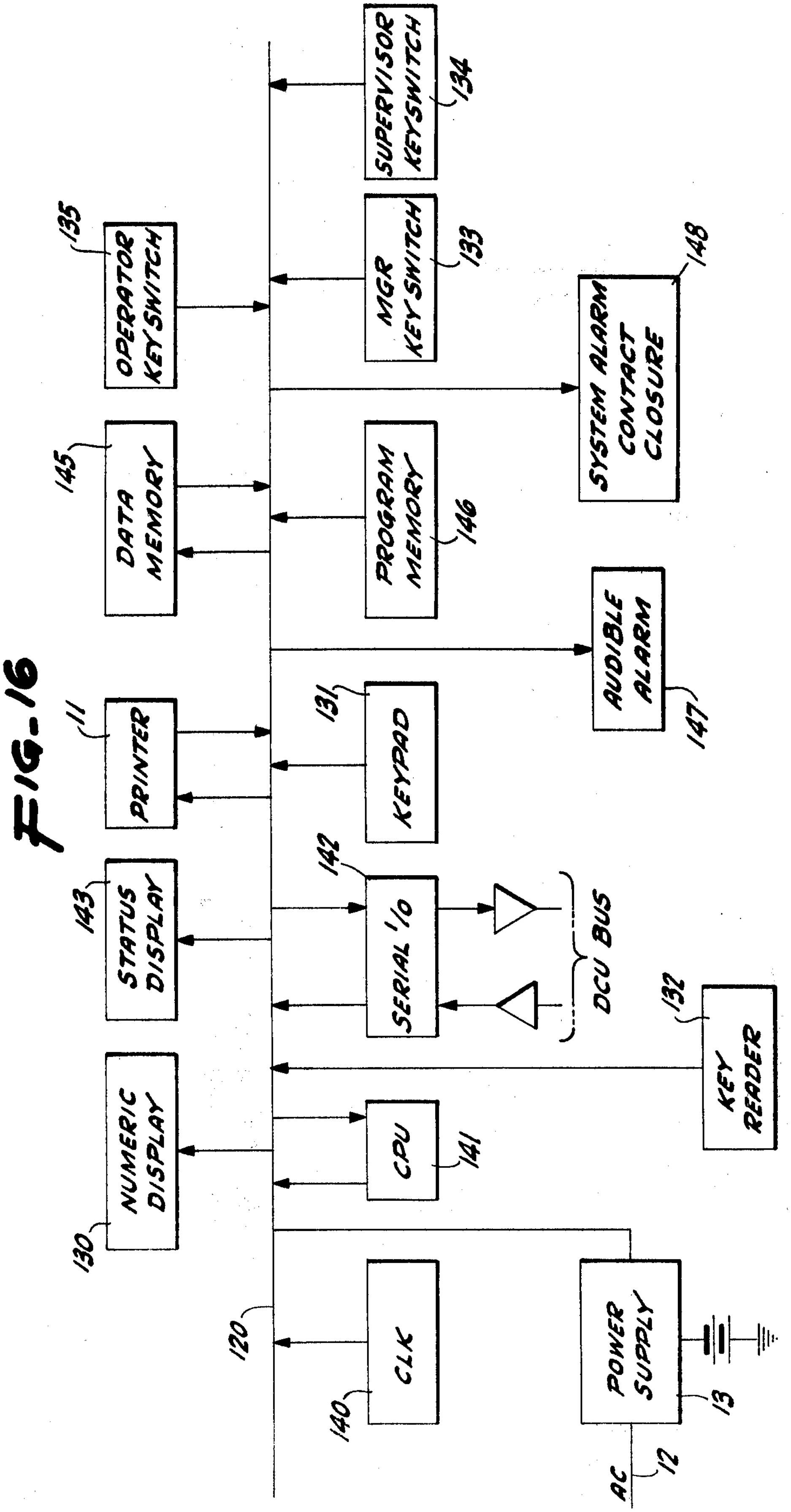

Referring now to FIGS. 15 and 16, there is shown therein a master control unit 10 of FIG. 1 and a block diagram for the master control unit.

Referring to FIG. 15, the front panel of the master control unit 10 of FIG. 1 is shown and includes the following controls and displays. The multidigit LED display 130 provides an alphanumeric readout of a particular room number and a decoded key.

The multikey numeric/function key pad 131 enables a particular key to be programmed to gain access to a particular door control unit. The system manager's mode selector switch 133 provides one level of access to a number of the door control units. The operator's key mode selector switch 135 enables one particular key to gain access to a door control unit. The supervisor mode selector switch 134 provides another level of gaining access to another predetermined number of door control units.

The status LED displays inform the supervisory personnel which mode of operation and other states of the master control unit.

The key reader 132 decodes the information on an encoded key to allow for programming a particular key to a particular door control unit.

A printer is connected to the master control unit as shown in FIG. 1 and provides for permanent recording of entries as obtained by the master control unit.

In FIG. 15, display 130 serves to verify proper numeric and control function entries. Any alarm conditions will cause an alphanumeric alarm code to be displayed, with room number or other data if required. Also, an audio alarm can be easily adapted into the system to inform supervisory personnel or others that in fact an alarm exists at a particular door control unit or with the master control unit.

The key pad 131 includes the following keys. Numbers 0–9, an entry, clear, key number, room number, set time, set day, assigned master, assigned submaster, assigned maid, assigned guest, reset alarm. A record of all commands can be recorded on the printer with the command and time.

The status LEDs include the following: power, alarm indication, busy, ready, system manager mode, supervisor mode, operator mode, paper low, and key pad error.

The system manager's mode switch 133 is provided for system manager functions (set time, set date, assigned master), and allows certain alarm conditions to be cleared.

All system transactions initiated by the master control unit and any error conditions reported by the door control units can be logged with time of day information onto the printer. A log entry can be made initially each morning, giving a new date.

A sonalert or other audible alarm is triggered at the master control unit if a system alarm condition is detected. The alarm will remain active until manually reset. If the alarm is a result of system manager function violation (e.g., illegel attempt to assign master key), the alarm will remain active until reset with the manager's switch in place. The audible alarm is used for operator feedback when entering data on the key pad when appropriate.

The subsystems of the master control units will be described briefly in conjunction with FIG. 16. The master control unit includes the power supply 12, the previously described display 130, printer 11, key pad 131, operator key switch 135, central processing unit 141, program memory 146, data memory 145, the interface to the DCU bus, and real time clock 140, all of which are interconnected via system data/address/control bus 120 in a manner well known in the art.

The power supply 12 contains a standard 110 volt AC single phase power supply. In the event of an outage in line power, battery 13 is automatically switched to provide power for a specified period.

The 60 hertz AC line operated clock 140 allows master control unit 10 to keep track of the time of day and date. During loss of line power, a crystal clock automatically supplants the line clock.

The central processing unit 141 provides necessary control of the operation of the system through techniques well known in the art.

The data and program memory are stored in the RAM 145 and ROM 146, respectively.

In a typical operation, a quantity of randomly coded keys such as depicted in FIG. 3 are supplied, no two of which are alike. The quantity is large enough to include all change keys as well as all master keys for various levels.

A key is assigned to a particular room by taking a key at random, inserting that key into master control unit's reader and punching in the room number. This procedure programs the processor in the addressed door to open when that key is inserted. The key will be honored by that door until it is cancelled or a new replacement key is assigned through the master control unit.

Multilevel master keys are assigned in similar manner. The authorized operator switches the master control unit to the master key mode, inserts a randomly coded key into the reader and assigns that key to any unit number of rooms.

Lost or stolen keys are rendered useless by simply programming the particular lock or locks to accept a new key. Lock combinations are readily changed for any reason and at any time. Locks can be programmed to authorize only at specific hours during the day. Each lock has the capacity to memorize, in one embodiment, up to sixteen different key combinations.

The printer as shown connected to the master control unit is provided for maintaining a permanent record of all assigned key codes, room number, date and time.

Alarms may be provided which may be activated when an unauthorized key is repeatedly inserted into a lock or the key slot is tampered with. An alarm could also be triggered when an unauthorized person attempts to assign master keys.

The key, of conventional size and shape, is made of nickel-silver. Various keyways may be milled into the key. In lieu of slots, holes, or apertures, the key code is assigned by black vertical bars recessed into the blade of the key. Hence, the problem of clogging of the keys having holes or apertures does not occur with the use of light-reflective bars. Each side of the key has two sets or series of "clocking" bars and "data" bars. The two sets of bars make the key reversible. Each set of sixteen clocking bars and corresponding data bars result in $2^{16}$ or 65,536 unique combinations. The clocking and data bars may be reversed, doubling the combinations to 131,072 per keyway.

The mechanical parts of the door lock, i.e., the door knobs, the latch, dead bolt, striker, etc., remain conventional. Only the pintumbler cylinder is replaced with an identical sized cylinder (such as for the key plug) which contains the reader and latch mechanism actuated by the solenoid. Each door contains a microprocessor and related circuitry for electronically locking and unlocking the door.

An operator inserts the key into the master control unit and encodes or keys in the proper room number. The room number addresses the desired door and the master control transmits the code along with the room address to all doors. The door with the appropriate address recognizes the command and is stored in the microprocessor unit. The door transmits the information back to the master control unit for verification. Communication between the doors and master control unit is in one embodiment done serially via hard wiring. Other communications can be via house wiring, infrared, or ultrasonic.

In summary, the present invention incorporates conventional lock hardware with no two keys coded alike. Various keyways are possible and rekeying can be confined to the central location of the master control unit. Lost or stolen keys are easily erased and door combinations can be changed instantly. Multilevel master keying is available and keys may be programmed for particular access periods for situations such as cleaning the hotel room by a maid. All systems are provided with a battery backup and an optional mechanical override is available. An alarm indicates insertion of an unauthorized key, lock tampering and unauthorized attempts to assign master keys. The printer can record all transactions.

While the present invention has been shown and described in conjunction with a door control unit, it should be pointed out that it can be utilized with other locks such as in alarm locks, vending machines and the like.

What is claimed is:

1. A door control system for selectively controlling the locking and unlocking of a plurality of doors, comprising:

a door locking means at each of said doors for locking or unlocking that door, a door control means located at each of said doors for operating the door locking means at that door to unlock that door, each said door control means including:

(1) a microprocessor having means for storing a plurality of key codes, any one of which is capable of permitting unlocking of the door locking means at that door, (2) key receiving means for receiving a key having a predetermined code thereon, key reading means for sensing that code and comparing means for comparing that code to the said code or codes stored in the microprocessor of that door, said sensing and comparing means being operable by referring to the microprocessor of that door control means, whereby upon matching of a key code and a code stored in that microprocessor, a signal is generated to unlock the door locking means, (3) a battery means for operating its respective microprocessor, to generate a signal, in the absence of external power, (4) said key receiving means including means for operating the unlocking means to unlock the door, by manual movement of the key, while still in the key receiving means, after said signal has been generated, and a master control means located at a master station remote from said doors, means for providing two way electrical communication between the master control means and all of said door control means, said two way communication including means for transmitting from each door control means to the master control unit (a) a return signal verifying the code stored at that door control means and (b) an information signal concerning a condition in the vicinity of that door control means, said master control means having means for reading the code of a key which has a predetermined key code thereon, and said master control means further having:

(1) means for causing a first predetermined key code to be stored in any one door control means of the system, (2) means for causing one or more additional predetermined key codes to be stored in a group of door control means of the system, and (3) means for cancelling any predetermined key code from the memory of a single door control means, from the memories of any group of door control means or from the memories of all said door control means.

2. The system of claim 1, said key receiving means including a cylindrical key plug mounted in the door and having a key opening therein to receive the key, the key reading means being arranged to read the key as it is inserted into said opening, said key plug being operably connected to the door locking means such that upon generation of the said signal, the key plug is permitted to rotate by manual turning of a key located in the opening to in turn unlock the door locking means.

3. The system of claim 2, wherein the key receiving means and the key reading means are located in the door, and the microprocessor is located in a stationary location adjacent the door and in electrical communication with the key reading means.

4. The system of claim 2, said key reading means including means for providing a light beam, and a photodiode for cooperation with the light beam, wherein the light beam is altered by moving coded portions of the key past the key reading means.

5. The system of claim 2, including a solenoid normally preventing operation of the door locking means by the key plug, the said signal operating the solenoid to allow operation of the door locking means by movement of the key plug.

6. The system of claim 1, including, in combination, a plurality of keys, each having a different predetermined code fixed thereon, which codes are readable by said key reading means at the master control means and also readable by the key reading means at each of said doors.

7. The system of claim 6, wherein each key has dimples formed in a side thereof to form the code.

8. The system of claim 1, further including smoke detector means connected to said microprocessors for sensing the presence of smoke and said information signal includes a signal conveying this information to the master control means.

9. The system of claim 1, wherein the microprocessor at each door includes an alarm means for indicating an attempt at an unauthorized opening of said door and said information signal includes a signal representing same.

10. The system of claim 1, wherein said master control means includes a timing means for selectively permitting the opening of some or all doors of the system only during predetermined times of the day.

11. The system of claim 1, including a printing means operatively connected to the master control means for providing a printed record of selected activities performed by the door control system.

12. The system of claim 1, said master control means including means for providing an alphanumeric readout of a room number or group of room numbers and also of a key code.

* * * * *